United States Patent
Caruana et al.

(10) Patent No.: US 11,398,121 B2
(45) Date of Patent: Jul. 26, 2022

(54) METHOD FOR PROVISIONING A DEVICE WITH AN INFORMATION ELEMENT ALLOWING TO IDENTIFY UNAUTHORIZED USERS IN A RESTRICTED AREA

(71) Applicant: THALES DIS FRANCE SA, Meudon (FR)

(72) Inventors: Jean-Paul Caruana, Meudon (FR); Pascal Leroy, Meudon (FR); Frédéric Martinez, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 145 days.

(21) Appl. No.: 16/620,401

(22) PCT Filed: Jun. 7, 2018

(86) PCT No.: PCT/EP2018/064971
§ 371 (c)(1),
(2) Date: Dec. 6, 2019

(87) PCT Pub. No.: WO2018/224579
PCT Pub. Date: Dec. 13, 2018

(65) Prior Publication Data
US 2021/0082217 A1    Mar. 18, 2021

(30) Foreign Application Priority Data
Jun. 7, 2017  (EP) ................................. 17305677

(51) Int. Cl.
*G07C 9/00*   (2020.01)
*H04W 12/06*  (2021.01)
(Continued)

(52) U.S. Cl.
CPC ..... *G07C 9/00571* (2013.01); *G07C 9/00563* (2013.01); *G07C 9/257* (2020.01);
(Continued)

(58) Field of Classification Search
CPC ............ G07C 2209/63; G07C 9/00563; G07C 9/00571; G07C 9/257; G07C 9/27;
(Continued)

(56) References Cited

U.S. PATENT DOCUMENTS

2011/0134240 A1*  6/2011  Anderson ................. G06T 7/73
                                            348/143
2016/0154394 A1*  6/2016  Peterson .................. G07C 9/28
                                            700/19
(Continued)

FOREIGN PATENT DOCUMENTS

| JP | 20138298 A | 1/2013 |
| WO | WO2016103332 A1 | 6/2016 |
| WO | WO2017043314 A1 | 3/2017 |

OTHER PUBLICATIONS

PCT/EP2018/064971, International Search Report, dated Aug. 16, 2018, European Patent Office, P.B. 5818 Patentlaan 2 NL—2280 HV Rijswijk.
(Continued)

*Primary Examiner* — Omer S Khan
(74) *Attorney, Agent, or Firm* — The Jansson Firm; Pehr B. Jansson

(57) ABSTRACT

This invention relates to a method for provisioning a wireless control device with an information element allowing to identify visually at least one unauthorized user in a restricted area, the restricted area comprising a gateless control area being equipped with at least an image sensor and an electronic reader supporting a short range radio technology allowing to read data memorized into a wearable device carried by a user. The method comprises the steps of: providing by the image sensor a digital image of at least one user that is detected as passing through the gateless control area; extracting from the provided digital image of the detected user a first face detection dataset; providing by the
(Continued)

electronic reader a second face detection dataset memorized in a wearable device carried by said detected user; applying facial recognition over the first and second face detection datasets in order to determine if the user associated to the first face detection dataset is the same as the one associated to the second face detection dataset, the detected user being identified as authorized in that case and identified as unauthorized otherwise; sending to a wireless control device a message comprising an information item adapted to ease the visual identification of an unauthorized user.

23 Claims, 4 Drawing Sheets

(51) Int. Cl.
*H04W 12/08* (2021.01)
*G07C 9/25* (2020.01)
*G07C 9/27* (2020.01)

(52) U.S. Cl.
CPC .............. *G07C 9/27* (2020.01); *H04W 12/06* (2013.01); *H04W 12/08* (2013.01); *G07C 2209/63* (2013.01)

(58) Field of Classification Search
CPC ....... G07C 9/28; G08B 13/22; H04L 63/0861; H04W 12/06; H04W 12/08; H04W 12/33
See application file for complete search history.

(56) References Cited

U.S. PATENT DOCUMENTS

2017/0076522 A1* 3/2017 Ives-Halperin ......... H04W 4/80
2017/0352256 A1* 12/2017 Miwa ..................... G06K 19/10

OTHER PUBLICATIONS

PCT/EP2018/064971, Written Opinion of the International Searching Authority, dated Aug. 16, 2018, European Patent Office, P.B. 5818 Patentlaan 2 NL—2280 HV Rijswijk—Pays Bas.

* cited by examiner

METHOD FOR PROVISIONING A DEVICE WITH AN INFORMATION ELEMENT ALLOWING TO IDENTIFY UNAUTHORIZED USERS IN A RESTRICTED AREA

TECHNICAL FIELD

The present invention relates to a method for provisioning a device with an information element allowing to identify unauthorized users in a restricted area. It is applicable to the field of gateless control systems.

BACKGROUND OF THE INVENTION

Gateless and hands-free access control systems are the new trend for transport and access environments. The absence of gates brings convenience for the users, as there is no need for them to tap or present a ticket. Further, it maximizes user or passenger throughput and avoid bottlenecks.

User's right to travel (or to access) is generally detected through a remote mechanism which is based on the use of radiofrequency, camera, wearable devices, smart or other technologies.

One drawback of gateless systems is that there is no direct way to stop a fraudulent user entering a restricted area, such as a barrier opening only for authorized users. Therefore, one or several control officers are generally responsible for inspecting the user's right to access the restricted area. This task can be fastidious and inefficient as it is difficult for a control officer to inspect all the users in a given restricted area. Additionally, unauthorized users need to be inspected timely before they leave or enter the restricted area.

SUMMARY OF THE INVENTION

This invention relates to a method for provisioning a wireless control device with an information element allowing to identify visually at least one unauthorized user in a restricted area. The restricted area comprises a gateless control area equipped with at least an image sensor and an electronic reader supporting a short range radio technology allowing to read data memorized into a wearable device carried by a user. The method comprises the steps of:
- providing by the image sensor a digital image of at least one user that is detected as passing through the gateless control area;
- extracting from the provided digital image of the detected user a first face detection dataset;
- providing by the electronic reader a second face detection dataset memorized in a wearable device carried by said detected user;
- applying facial recognition over the first and second face detection datasets in order to determine if the user associated to the first face detection dataset is the same as the one associated to the second face detection dataset, the detected user being identified as authorized in that case and identified as unauthorized otherwise;
- sending to a wireless control device a message comprising an information item adapted to ease the visual identification of an unauthorized user.

According to an embodiment, the method comprises the step of receiving data allowing the localization of at least one wireless control device.

According to an example, the method comprises the steps of:
- providing by the electronic reader access rights data contained into at least a wearable device carried by at least a detected user;
- based on the provided access rights data, identifying users as unauthorized if the provided access rights data does not allow a detected user to enter into the restricted area.

In an example, Ultra-wideband is used as the short range technology for the electronic reader and the wearable device to communicate.

According to an example, the method comprises the steps of receiving data allowing to localize the unauthorized user, generate an information element representative of said localization data, and send this information element to the wireless control device.

According to an example, the first and second detection datasets correspond to a predefined set of facial features.

According to an example, the second face detection dataset is memorised securely into the wearable device.

According to an example, the method comprises the step of receiving and analysing the digital image captured by the image sensor in order to detect the presence of the one or several users that are passing through the gateless control system.

According to an example, one information item that is transmitted to the wireless control device is a picture having the format of a photo ID extracted from the one that has been captured by the image sensor.

According to an example, one information item that is transmitted to the wireless control device is adapted to allow a control officer to recognize the outer appearance of an unauthorized user.

According to an example, the method comprises the step of formatting a control report such that the information items related to a plurality of unauthorized users are transmitted in a single message to the wireless control device.

According to an example, the restricted area is composed of at least two sub-areas, one or several information element associated to a given unauthorized user being transmitted to a wireless control device present in the sub-area where said associated unauthorized user is localized.

According to an example, a restricted area is divided into multiple sub-areas, comprising the step of verifying access rights attributed to a given user depending of its localization.

The invention also relates to a data processing system comprising means for carrying out the steps of the method described above.

The invention also relates to a computer program product comprising instructions which, when the program is executed by a computer, cause the computer to carry out the steps of the method described above.

The invention also relates to a computer-readable storage medium comprising instructions which, when executed by a computer, cause the computer to carry out the steps of the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

In this description, the expression "restricted area" designates an area with a restricted access. This means that only authorized persons are allowed to enter, stay and/or travel freely in this area. A person entering, staying and/or travelling into a restricted area is called a user. Therefore, one can have authorized users and unauthorized users.

The expression "gateless control area" designates an area generally located in the restricted area allowing to verify if a user passing through it is authorized or unauthorized to access the restricted area.

A "gateless entrance area" refers to a specific example of a gateless control area. A gateless entrance area allows the users to access a given restricted area. According to an example one or several gateless entrance areas are set up such that a user needs to go through one of them if he wants to access a given restricted area.

Further, a "gateless control area" is said gateless as the users can move freely without requiring the opening of a closed gate to access the restricted area.

A user is said detected when he passes through the gateless entrance area and is identified as such by the access control system.

In the following description, a wireless control device designates a device that is capable of receiving data on a wireless interface and displaying it to a control officer carrying the device. It can be implemented thanks to a combination of hardware and software and support one or several wireless technologies such as Wi-Fi, Bluetooth, Universal Mobile Telecommunications System (UMTS), LTE (Long Term Evolution), Global System for Mobile Communications (GSM).

Figure 1:
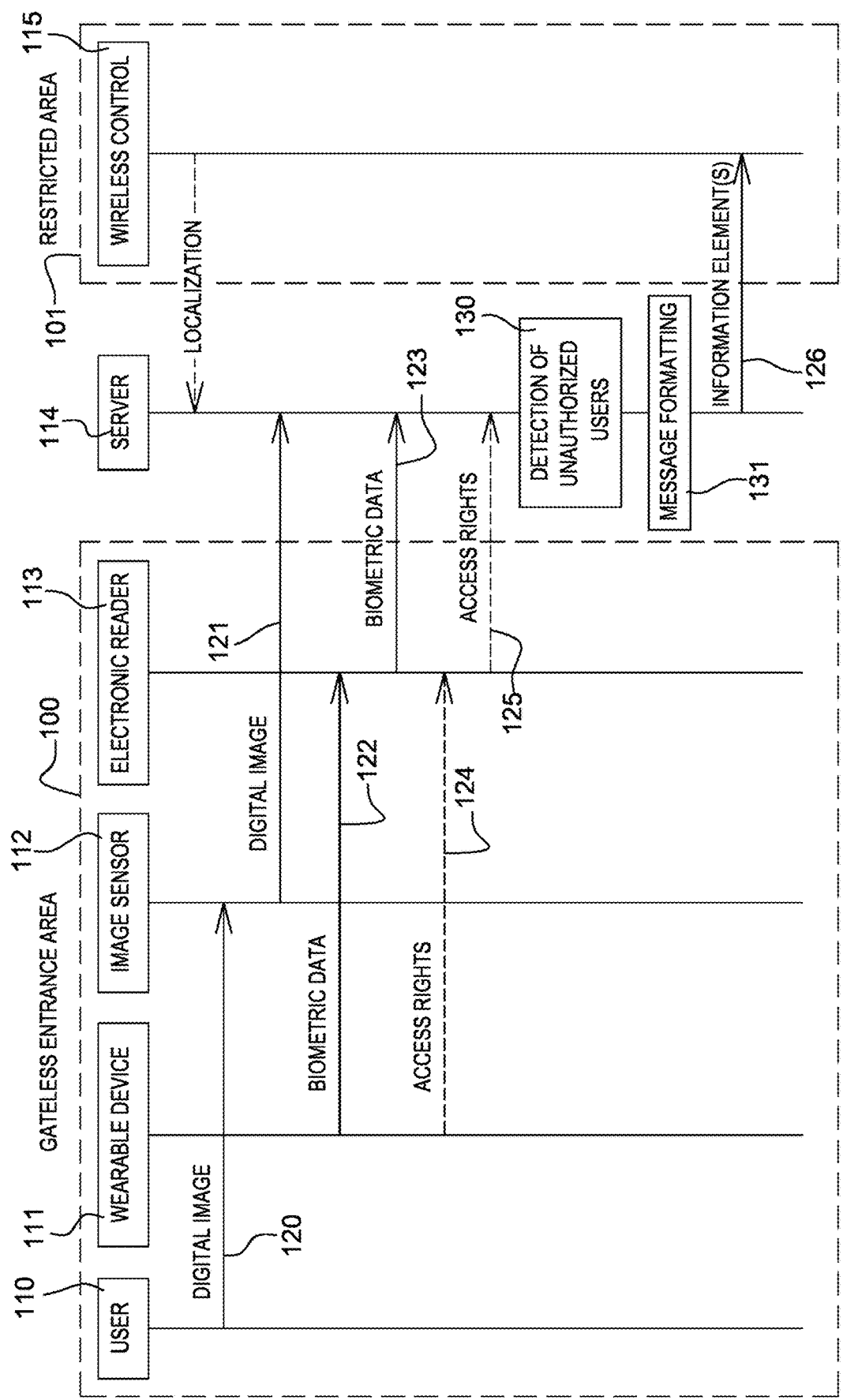
FIG. 1 is a sequence diagram illustrating the functioning of a gateless access control system adapted to help identifying unauthorized users that are present in a restricted area.

FIG. 1 is a sequence diagram illustrating the functioning of a gateless access control system adapted to help identifying unauthorized users that are present in a restricted area.

According to this example, the access control system comprises a gateless control area 100 and a restricted area 101.

The gateless control area 100 is equipped with an image sensor 112 allowing to take pictures of the users that are passing through it. It also comprises an electronic reader 113 adapted to read data memorized into wearable devices that are carried by the users. In order to communicate with each other, the electronic reader and the wearable devices are supporting at least a short range radio technology. In one embodiment of the invention, Ultra-wideband (UWB) can be chosen for that purpose.

On the sequence diagram provided with FIG. 1, a user 110 and its wearable control device 111 are also represented as passing through the gateless control area 100.

The image sensor 112 captures a digital image of the user passing through the gateless control area. For example, the image sensor is a camera that is located in a fixed position in the gateless control area. It can be configured to take one picture for each user that is passing thorough the gateless control area or to take a picture one which several images of users are captured. For example, the image sensor is capable of detecting movement in the gateless control area, and when a movement is detected, the acquisition of a digital image is triggered.

Then, the acquired digital image is transferred 121 to a remote server 114. It can be located anywhere and it is capable of exchanging data with the image sensor 112, the electronic reader 113 and a controller's device 115.

According to one embodiment, the remote server 114 is capable of analysing the digital images received from the image sensor 112. In particular, it can be configured to detect the presence of the users that are passing through the gateless control system. For example if three users are captured in a given digital image, the number of detected users is estimated.

An analysis can also be performed to extract different types of data. According to the invention, facial recognition techniques are used to distinguish authorized users from unauthorized ones. For that purpose, the remote server can be adapted to isolate the faces of the detected users and extract for each of them a first face detection dataset comprising for example a predefined set of facial features.

Then, the electronic reader 113 reads data memorised in the wearable device 111 carried by each of the detected users. For example, the wearable devices are provisioned with biometric data of its owner. In a preferred embodiment, a second facial detection dataset provisioned in the wearable device for its owner is memorised securely into the wearable device. This sensible information can be stored in an encrypted form. The ciphering and/or deciphering of this second facial detection dataset can be managed in that case by a secure enclave embedded in the wearable device 111. The second face detection dataset is therefore obtained 122 by the electronic reader 113 from the wearable device 111 and then transferred 123 to the remote server 114.

At this stage, the remote server 114 is capable of applying for each detected user a facial recognition algorithm on the first and second face detection datasets.

The person skilled in the art is capable of applying various facial recognition algorithms belonging to the state of the art. For example, the first and second face detection datasets correspond to selected facial features. An example of facial feature is the position and size of the eyes of a user. By analysing the two sets, it is possible to determine if the user with its face detected on the digital image captured by the image sensor 112 corresponds to the owner of the wearable device. Alternatively or as a complement, other existing technologies can be used and chosen among those mentioned in this non-limitative list: three dimensional recognition, skin texture analysis, Eigenface or neural networks analysis.

The facial recognition algorithm applied to the first and second face detection datasets allows determining 130 if the user associated with the first face detection dataset is the same as the one associated with the second face detection dataset. If it is the case, the detected user is identified as authorized. On the contrary, if the detected user that is associated with the first face detection dataset is not the same as the one associated with the second face detection dataset, the user is identified as unauthorized.

Another case can also be taken into account by the access control system. When a user goes through the gateless control area without carrying any wearable device, the facial recognition algorithm cannot be applied as only one dataset is available, that is to say the one extracted from the captured digital image.

Then, the remote server 114 prepares 131 a message comprising one or several information items easing the visual identification of an unauthorized user by a control officer. The message is then transmitted 126 to a wireless control device assigned to a control officer.

The one or several information items transmitted 126 to the wireless control device can be of different types. For example, a picture having the format of a photo ID extracted from the one that has been captured by the image sensor 112. Another example is to provide information on the unauthorized user's outer appearance, such as the way he is dressed. For example, an information item indicates if the unauthorized user wears a skirt or a trouser, another data item provides the colour of the coat worn by the unauthorized use. These data items can be generated by the remote server 114 by applying artificial intelligence processing to the digital picture captured by the image sensor 112.

If several unauthorized users are identified, the control report 126 can be formatted such that information items related to a plurality of unauthorized user are transmitted in a single message to the wireless control device.

According to another example, access rights data is obtained 124 by the electronic reader 113 from the wearable device 111 and then transmitted 125 to the remote server 114.

For example, if the restricted area is a subway station, the access right data may correspond to a subscription information showing that the user is authorized to enter the station by paying the required subscription fee. Therefore, the proposed mechanism can be adapted to include at least one verification mechanism among a first and a second mechanism. The first one allows to identify the user entering the restricted area as the genuine owner of the wearable device and the second one allows to verify the access rights of the user.

According to an alternative example, the server 114 can be configured such that it is able to determine if a detected user associated with the first face detection dataset is the same as the one associated to a second face detection dataset memorized in an internal of external database accessible said server 114. In that case, there is no need for the user to carry a wearable device 111 nor to use an electronic reader 113.

Figure 2:
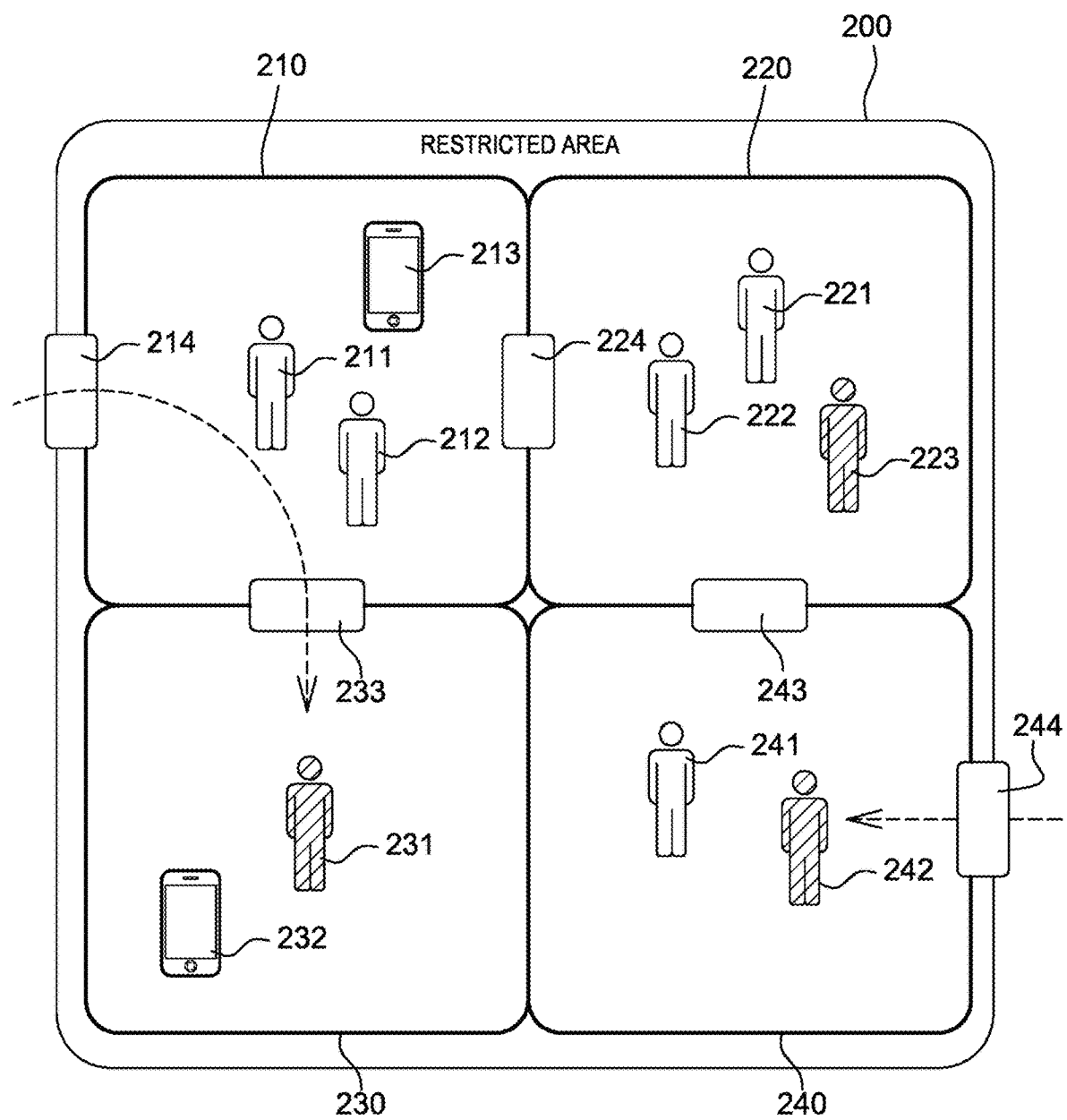
FIG. 2 illustrates a restricted area divided into four sub-areas where three unauthorized users are identified.

FIG. 2 illustrates a restricted area divided into four sub-areas where three unauthorized users are identified.

In this example, a restricted area 200 comprises four sub-areas 210, 220, 230 and 240. In order to enter a given sub-area, a user has to cross a gateless entrance area. More precisely, in order to enter sub-area 210, a user has to go through gateless entrance area 214 or 233. Similarly, in order to enter sub-area 220, a user has to go through gateless entrance area 224 or 243. In order to enter sub-area 230, a user has to go through gateless entrance area 233. In order to enter sub-area 240, a user has to go through gateless entrance area 243 or 244.

According to this example, users are present in each of the four sub-area 210, 220, 230 and 240. Some of these users are identified as authorized 211, 212, 221, 222, 241 and some others are identified as unauthorized 223, 231, 242. Further, two control officers are equipped with a wireless control device 213, 232. The first control officer is present in sub-area 210 and the second control officer is present in sub-area 230. It is to be noted that there is no control officer present in sub-areas 220 and 240.

A user is detected when it passes through a gateless entrance area. A gateless entrance is being equipped with at least an image sensor and an electronic reader capable of reading data memorized into a wearable device carried by a user. According to the invention, it is verified if the detected users are authorized or unauthorized to enter a given restricted area, or a given sub-area which is part of a given restricted area. This can be implemented using the same processing as those described with FIG. 1.

In this example, two authorized users 211, 212 both carrying a wearable device are present in sub-area 210. They were detected when going through a given gateless entrance area and then identified as authorized. For that purpose, a picture captured by the image sensor of a given gateless entrance area allowed the user to be identified as the legitimate owner of its associated wearable device.

Another user 231 was first detected when going through 250 entrance area 214 and identified as unauthorized. In one embodiment, when the user 231 was in sub-area 210 and identified as unauthorized, an information element is generated, for example by a server from which data related to the detected users are managed. This information element can be chosen among:

- a photo similar to those present on photo identification documents, comprising the face of the unauthorized user;
- a description of how the unauthorized user is dressed, this type of information being obtained from the analysis of the digital picture obtained by the image sensor;
- information about the presence or absence of a subscription;
- an identifier of the sub-area where the unauthorized user is localized.

The list above is non-limitative and provided for exemplary purpose only. According to an embodiment, one or several information element could be then transmitted to the wireless control device 213 that is localized in the sub-area 210. At this stage, the control officer is aware that an unauthorized user entered into this sub-area and the received information element displayed on its device allow him to visually identify the unauthorized user and perform additional verifications and/or issue a fine if needed.

The unauthorized device then goes through 250 the gateless entrance area 233 and reaches the sub-area 230. Because the unauthorized user is detected as changing of sub-area, the wireless electronic device 232 of the control officer present in sub-area 232 receive at least an alert comprising at least one information element easing the visual identification of the unauthorized user 231.

An unauthorized user 223 is present in subarea 220 and an unauthorized user 242 is present in subarea 240, but there is no control officer present there. In that case, an alert can be transmitted to the wireless electronic devices 213 and 232 comprising an information element identifying the sub-areas where unauthorized users are localized. The control officer may then decide to move towards these sub-areas.

According to one aspect of the invention, a restricted area that is divided into multiple sub-areas can handle precisely access rights attributed to a given user that are depending of the user's localization. For example, a given user can have access rights allowing him to go in sub-area 210 but not in sub-area 230. It is for example the case for user 231 identified by the gateless access system as authorized when localized in sub-area 210 and unauthorized when localized in sub-area 230.

The electronic reader and the wearable devices are embedding a set of hardware and software components needed to implement a short range technology.

According to one embodiment, the short-range communication technology is Ultra-wideband (UWB) communications. This technology has a significant advantage in addition of providing high-bandwidth communications for a low energy consumption.

In UWB technology, a signal with ultra-wide bandwidth is generated using electrical short, baseband pulses. Using this technology, it is possible to localize wearable devices or tags with a good accuracy. Typically, fifteen centimetres at ten meters can be achieved. This means that when a user is detected in a gateless control area, it can be precisely localized. An information element corresponding to the geographical coordinates obtained thanks to this technology can be transmitted to a wireless electronic device carried by a control officer. As an example, an application installed on the wireless electronic device allows displaying the position of the unauthorized user on a map.

In one aspect of the invention, in addition to the gateless control area, the restricted area can be covered at least partially by a plurality of short range transceiver allowing to localize them and to follow their movements. Localization information updates of unauthorized users can be transmitted to the wireless electronic devices carried by the control officers.

Figure 3:
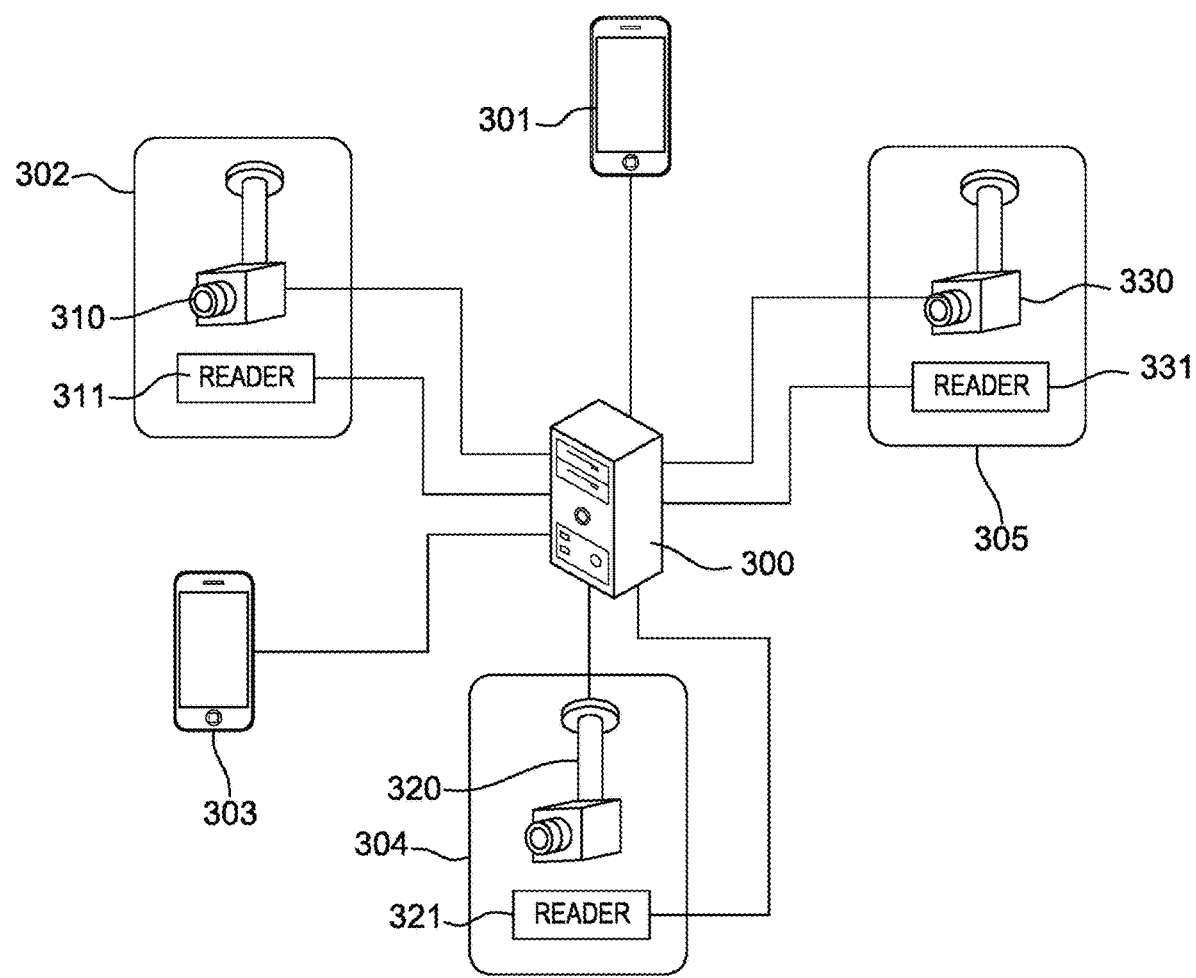
FIG. 3 provides an example of a centralized system architecture that can be used to identify unauthorized users in a restricted area.

FIG. 3 provides an example of a centralized system architecture that can be used to identify unauthorized users in a restricted area.

In this example, three gateless control areas 302, 304, 305 are deployed in a restricted area. These gateless control areas comprise an image sensor 310, 320, 330 and an electronic reader 311, 321, 331. Further, several wireless electronic devices 301, 303, for example smartphones, are deployed in the restricted area. When a user is crossing a gateless control area, data is captured and transmitted to a remote server 300. For example, a digital image can be acquired by the image sensor and biometric data contained in a wearable device carried by the user can be obtained thanks to the reader. The remote server 300 is in charge of centralizing these data and applying one or several processing to identify unauthorized users. It is also responsible of generating the information elements that will be transmitted to the wireless electronic devices 301, 303. The remote server 300 can be communicate with the other devices through wired and or wireless networks.

This architecture is provided for exemplary purpose only and the skilled person will appreciate that other alternatives can be conceived. For example, the processing allowing the identification of an unauthorized user based on digital images and/or access rights can be handled locally for some of them, in the reader or in the image sensor. Further, in FIG. 3, only one server 300 is represented. However, several servers can be used to perform the aforementioned functions.

Figure 4:
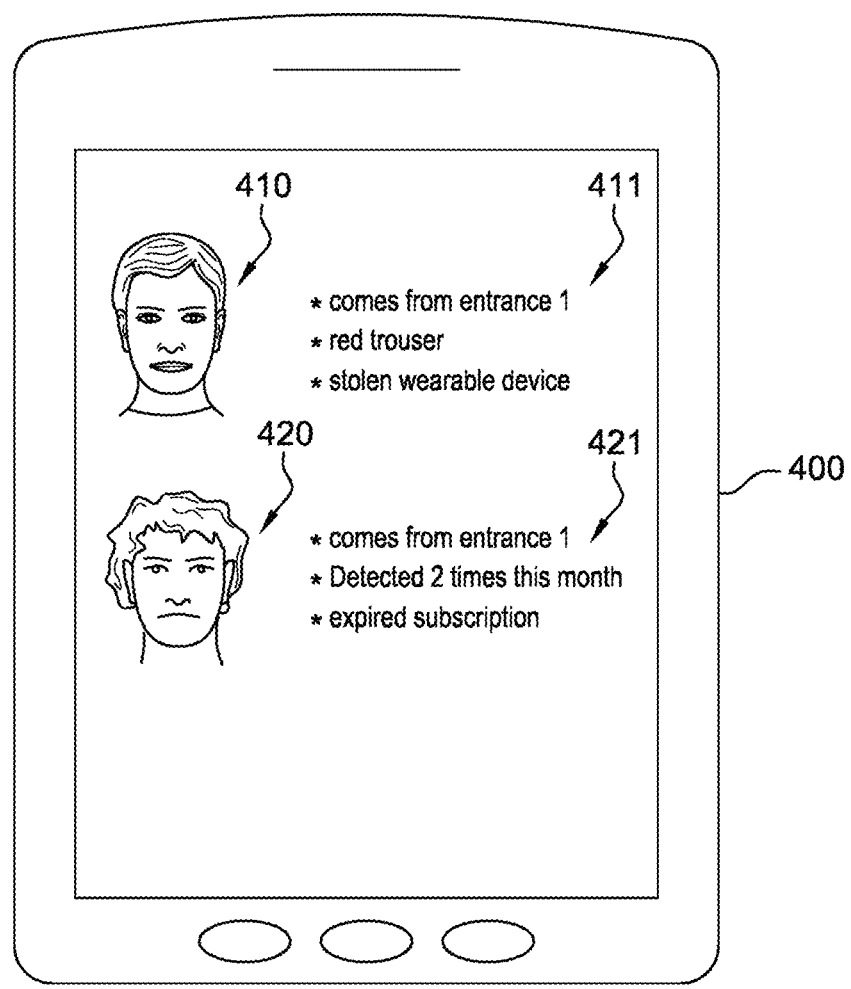
FIG. 4 represents a wireless control device on which several information elements are displayed.

FIG. 4 represents a wireless control device on which several information elements are displayed.

According to this example, two unauthorized users have been identified by the gateless access control system. Several information elements have been transmitted to the wireless control device of a control officer.

For the first user 410, four information elements have been received by the control officer: a photo ID and three additional data items 411.

For the second unauthorized user 420, four information elements have been received by the control officer: a photo ID and three additional data items 421.

Based on the received information items, the control officer is able to easily identify the unauthorized user in the restricted area and to take the required actions. For example, unauthorized user 410 is maybe dangerous as he owns a stolen wearable device. Therefore, the control officer may call for back-up and control unauthorized user 420 before controlling 410.

The invention claimed is:

1. A method for provisioning a wireless control device with an information element allowing to identify visually at least one unauthorized user in a restricted area, the restricted area comprising a first gateless control area being equipped with at least a first image sensor and a first electronic reader supporting a short range radio technology allowing to read data memorized into wearable devices carried by authorized users, the restricted area divided between at least a first subarea and a second subarea divided by a second gateless control area being equipped with at least a second image sensor and a second electronic reader supporting a short range radio technology allowing to read data memorized into wearable devices carried by authorized users, the method comprising the steps of:

providing by the first image sensor a digital image of at least one user that is detected as passing through the first gateless control area;

if the user detected as passing through the first gateless control area carries one of said wearable devices carried by authorized users:

extracting from the provided digital image of the detected user a first face detection dataset;

providing by the first electronic reader a second face detection dataset memorized in the wearable device carried by said detected user;

applying facial recognition over the first and second face detection datasets in order to determine if the user associated to the first face detection dataset is the same as the one associated to the second face detection dataset, the detected user being identified as authorized in that case to enter the first subarea;

identifying the user detected as passing through the first gateless control area as unauthorized for entry into the first subarea if the user associated to the first face detection dataset is not the same as the one associated to the second face detection dataset;

if the user detected as passing through the first gateless control area does not carry one of said wearable devices carried by authorized users, identifying the user detected as passing through the first gateless control area as unauthorized for entry into the first subarea; and if the user detected as passing through the first gateless control area is identified as unauthorized for entry into the first subarea:

generating an information item representative of data allowing to localize at least one unauthorized user who is present in the first subarea of the restricted area, wherein there is no control officer present in the first subarea, preparing a first message comprising one or several information items adapted to ease the visual identification of the user detected as passing through the first gateless control area and the information item representative of data allowing to localize the user; and sending to the wireless control device of a control officer who is not present in the first subarea the first message comprising the one or several information items adapted to ease the visual identification of the unauthorized user and the information item representative of data allowing to localize the user; and if the user detected as passing through the first gateless control area is identified as authorized for entry into the first subarea is detected as passing through the second gateless control area, determining if the user is authorized for entry into the second subarea and if the user is not authorized for entry into the second subarea:
  generating an information item representative of data allowing to localize at least one unauthorized user who is present in the second subarea of the restricted area, wherein there is no control officer present in the second subarea;
  preparing a second message comprising one or several information items adapted to ease the visual identification of the user detected as passing through the second gateless control area and the information item representative of data allowing to localize the user; and
  sending to the wireless control device of the control officer who is not present in the second subarea the second message comprising the one or several information items adapted to ease the visual identification of the unauthorized user.

2. The method according to claim 1, comprising the step of receiving data allowing the localization of the wireless control device.

3. The method according to claim 1, comprising the steps of:
  providing by the first electronic reader access rights data for the second subarea contained into the wearable device carried by at least a detected user;
  based on the provided access rights data, identifying users as unauthorized for entry into the second subarea if the provided access rights data does not allow a detected user to enter into the second subarea.

4. The method according to claim 1, wherein Ultra-wideband (UWB) is used as the short range technology for the first electronic reader and the wearable device to communicate.

5. The method according to claim 1, comprising the steps of receiving data allowing to localize the unauthorized user, generate an information element representative of said localization data, and send this information element to the wireless control device.

6. The method according to claim 1, wherein the first and second detection datasets correspond to a predefined set of facial features.

7. The method according to claim 6, wherein the second face detection dataset is memorised securely into the wearable device.

8. The method according to claim 1, comprising the step of receiving and analysing the digital image captured by the first image sensor in order to detect the presence of the one or several users that are passing through the first gateless control system.

9. The method according to claim 1, wherein one information item that is transmitted to the wireless control device is a picture having the format of a photo ID extracted from the one that has been captured by the first image sensor.

10. The method according to claim 1, wherein one information item that is transmitted to the wireless control device is adapted to allow the control officer to recognize the outer appearance of an unauthorized user.

11. The method according to claim 1, comprising the step of formatting a control report such that the information items related to a plurality of unauthorized users are transmitted in a single message to the wireless control device.

12. A data processing system for provisioning a wireless control device with an information element allowing to identify visually at least one unauthorized user in a restricted area, the restricted area comprising a first gateless control area being equipped with at least a first image sensor and a first electronic reader supporting a short range radio technology allowing to read data memorized into wearable devices carried by authorized users, the restricted area divided between at least a first subarea and a second subarea divided by a second gateless control area being equipped with at least a second image sensor and a second electronic reader supporting a short range radio technology allowing to read data memorized into wearable devices carried by authorized users, the data processing system comprising means for carrying out the steps of a method comprising the steps:
  providing by the first image sensor a digital image of at least one user that is detected as passing through the first gateless control area;
  if the user detected as passing through the first gateless control area carries one of said wearable devices carried by authorized users:
    extracting from the provided digital image of the detected user a first face detection dataset;
    providing by the first electronic reader a second face detection dataset memorized in the wearable device carried by said detected user;
    applying facial recognition over the first and second face detection datasets in order to determine if the user associated to the first face detection dataset is the same as the one associated to the second face detection dataset, the detected user being identified as authorized in that case to enter the first subarea;
    identifying the user detected as passing through the first gateless control area as unauthorized for entry into the first subarea if the user associated to the first face detection dataset is not the same as the one associated to the second face detection dataset;
  if the user detected as passing through the first gateless control area does not carry one of said wearable devices carried by authorized users, identifying the user detected as passing through the first gateless control area as unauthorized for entry into the first subarea; and
  if the user detected as passing through the first gateless control area is identified as unauthorized for entry into the first subarea:
    generating an information item representative of data allowing to localize at least one unauthorized user who is present in the first subarea of the restricted area, wherein there is no control officer present in the first subarea:
    preparing a first message comprising one or several information items adapted to ease the visual identification of the user detected as passing through the first gateless control area and the information item representative of data allowing to localize the user; and
    sending to the wireless control device of a control officer who is not present in the first subarea the message comprising the one or several information items adapted to ease the visual identification of the unauthorized user and the information item representative of data allowing to localize the user; and
  if the user detected as passing through the first gateless control area is identified as authorized for entry into the first subarea is detected as passing through the second gateless control area, determining if the user is authorized for entry into the second subarea and if the user is not authorized for entry into the second subarea:

generating an information item representative of data allowing to localize at least one unauthorized user who is present in the second subarea of the restricted area, wherein there is no control officer present in the second subarea;

preparing a second message comprising one or several information items adapted to ease the visual identification of the user detected as passing through the second gateless control area and the information item representative of data allowing to localize the user; and sending to the wireless control device of the control officer who is not present in the second subarea the second message comprising the one or several information items adapted to ease the visual identification of the unauthorized user.

13. A computer-readable non-transitory storage medium comprising instructions which, when executed by a computer, cause the computer to provision a wireless control device with an information element allowing to identify visually at least one unauthorized user in a restricted area, the restricted area comprising a first gateless control area being equipped with at least a first image sensor and a first electronic reader supporting a short range radio technology allowing to read data memorized into wearable devices carried by authorized users, the restricted area divided between at least a first subarea and a second subarea divided by a second gateless control area being equipped with at least a second image sensor and a second electronic reader supporting a short range radio technology allowing to read data memorized into wearable devices carried by authorized users, by carrying out the steps of a method comprising the steps:

providing by the first image sensor a digital image of at least one user that is detected as passing through the first gateless control area;

if the user detected as passing through the first gateless control area carries one of said wearable devices carried by authorized users:

extracting from the provided digital image of the detected user a first face detection dataset;

providing by the first electronic reader a second face detection dataset memorized in the wearable device carried by said detected user;

applying facial recognition over the first and second face detection datasets in order to determine if the user associated to the first face detection dataset is the same as the one associated to the second face detection dataset, the detected user being identified as authorized in that case to enter the first subarea;

identifying the user detected as passing through the first gateless control area as unauthorized for entry into the first subarea if the user associated to the first face detection dataset is not the same as the one associated to the second face detection dataset;

if the user detected as passing through the first gateless control area does not carry one of said wearable devices carried by authorized users, identifying the user detected as passing through the first gateless control area as unauthorized for entry into the first subarea; and if the user detected as passing through first the first gateless control area is identified as unauthorized for entry into the first subarea:

generating an information item representative of data allowing to localize at least one unauthorized user who is present in the first subarea of the restricted area, wherein there is no control officer present in the first subarea;

preparing a first message comprising one or several information items adapted to ease the visual identification of the user detected as passing through the first gateless control area and the information item representative of data allowing to localize the user; and sending to the wireless control device of a control officer who is not present in the first subarea the message comprising the one or several information items adapted to ease the visual identification of the unauthorized user and the information item representative of data allowing to localize the user; and if the user detected as passing through the first gateless control area is identified as authorized for entry into the first subarea is detected as passing through the second gateless control area, determining if the user is authorized for entry into the second subarea and if the user is not authorized for entry into the second subarea:

generating an information item representative of data allowing to localize at least one unauthorized user who is present in the second subarea of the restricted area, wherein there is no control officer present in the second subarea;

preparing a second message comprising one or several information items adapted to ease the visual identification of the user detected as passing through the second gateless control area and the information item representative of data allowing to localize the user; and sending to the wireless control device of the control officer who is not present in the second subarea the second message comprising the one or several information items adapted to ease the visual identification of the unauthorized user.

14. The data processing system according to claim 12, comprising the step of receiving data allowing the localization of the one wireless control device.

15. The data processing system according to claim 12, comprising the steps of:

providing by the first electronic reader access rights data for the second subarea contained into at least the wearable device carried by at least a detected user;

based on the provided access rights data, identifying users as unauthorized for entry into the second subarea if the provided access rights data does not allow a detected user to enter into the second subarea.

16. The data processing system according to claim 12, wherein Ultra-wideband (UWB) is used as the short range technology for the first electronic reader and the wearable device to communicate.

17. The data processing system according to claim 12, comprising the steps of receiving data allowing to localize the unauthorized user, generate an information element representative of said localization data, and send this information element to the wireless control device.

18. The data processing system according to claim 12, wherein the first and second detection datasets correspond to a predefined set of facial features.

19. The data processing system according to claim 18, wherein the second face detection dataset is memorised securely into the wearable device.

20. The data processing system according to claim 12, comprising the step of receiving and analysing the digital image captured by the first image sensor in order to detect the presence of the one or several users that are passing through the first gateless control system.

21. The data processing system according to claim 12, wherein one information item that is transmitted to the wireless control device is a picture having the format of a photo ID extracted from the one that has been captured by the first image sensor.

22. The data processing system according to claim 12, wherein one information item that is transmitted to the wireless control device is adapted to allow the control officer to recognize the outer appearance of an unauthorized user.

23. The data processing system according to claim 12, comprising the step of formatting a control report such that the information items related to a plurality of unauthorized users are transmitted in a single message to the wireless control device.

* * * * *